United States Patent
Mizutani et al.

(10) Patent No.: US 9,587,126 B2
(45) Date of Patent: Mar. 7, 2017

(54) PHOTOCURABLE INK COMPOSITION FOR INJET PRINTING AND PRINTED MATERIAL

(71) Applicant: SAKATA INX CORPORATION, Osaka-shi, Osaka (JP)

(72) Inventors: Shinya Mizutani, Osaka (JP); Takuya Myose, Osaka (JP); Tadashi Hirose, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 14/415,059

(22) PCT Filed: Jul. 17, 2013

(86) PCT No.: PCT/JP2013/069386
§ 371 (c)(1),
(2) Date: Jan. 15, 2015

(87) PCT Pub. No.: WO2014/014017
PCT Pub. Date: Jan. 23, 2014

(65) Prior Publication Data
US 2015/0203695 A1    Jul. 23, 2015

(30) Foreign Application Priority Data

Jul. 18, 2012 (JP) ................. 2012-159891

(51) Int. Cl.
| | | |
|---|---|---|
| C09D 11/107 | (2014.01) | |
| C09D 11/101 | (2014.01) | |
| C09D 11/322 | (2014.01) | |
| B41J 2/01 | (2006.01) | |
| C09D 11/00 | (2014.01) | |
| C09D 11/30 | (2014.01) | |
| B41M 7/00 | (2006.01) | |

(52) U.S. Cl.
CPC .......... C09D 11/107 (2013.01); B41J 2/01 (2013.01); C09D 11/00 (2013.01); C09D 11/101 (2013.01); C09D 11/30 (2013.01); C09D 11/322 (2013.01); B41M 7/0081 (2013.01); Y10T 428/24802 (2015.01)

(58) Field of Classification Search
CPC ... C09D 11/107; C09D 11/101; C09D 11/322; B41J 2/01; B41M 7/0081
See application file for complete search history.

(56) References Cited

U.S. PATENT DOCUMENTS

| | | | |
|---|---|---|---|
| 2012/0113201 A1* | 5/2012 | Kagose | ........... C09D 4/00 347/102 |
| 2012/0147095 A1 | 6/2012 | Miura et al. | |
| 2012/0270018 A1 | 10/2012 | Mizutani et al. | |

FOREIGN PATENT DOCUMENTS

| | | |
|---|---|---|
| EP | 2 913 370 | 9/2015 |
| EP | 2 924 080 | 9/2015 |
| JP | 2004-067991 | 3/2004 |
| JP | 2006-169419 | 6/2006 |
| JP | 2012-092291 | 5/2012 |
| JP | 2012-102295 | 5/2012 |
| JP | 2012-116934 | 6/2012 |
| JP | 2012-126885 | 7/2012 |
| JP | 2012-236966 | 12/2012 |
| JP | 2012-255072 | 12/2012 |
| JP | 2013-060548 | 4/2013 |
| JP | 2013-245240 | 12/2013 |
| JP | 2014-005438 | 1/2014 |
| WO | 2010/143738 | 12/2010 |

* cited by examiner

Primary Examiner — Betelhem Shewareged
(74) Attorney, Agent, or Firm — Hamre, Schumann, Mueller & Larson, P.C.

(57) ABSTRACT

Provided is a photocurable ink composition for inkjet printing which is favorably cured with light from a light-emitting diode (LED), favorably adheres to a polyvinyl chloride sheet such as a tarpaulin and a vinyl chloride resin sheet, suppresses the occurrence of cockling, and has both safety and favorable ejection stability at room temperature when ejected from an inkjet head for low-viscosity ink, and a printed material. The present invention is a photocurable ink composition for inkjet printing containing photopolymerizable compounds and a photopolymerization initiator. The photopolymerizable compounds are vinyloxyethoxyethyl acrylate and benzyl acrylate, and contained in specific amounts. The photopolymerization initiator is a compound that expresses an initiator function when irradiated with light having a wavelength within the range of 450 to 300 nm. The photocurable ink composition has a flash point of 70° C. or higher and a viscosity at 25° C. of 5 mPa·s or lower, and further contains 50% by mass or more of a monofunctional monomer.

5 Claims, No Drawings

PHOTOCURABLE INK COMPOSITION FOR INJET PRINTING AND PRINTED MATERIAL

TECHNICAL FIELD

The present invention relates to a photocurable ink composition for inkjet printing and a printed material. More specifically, the present invention relates to a photocurable ink composition for inkjet printing which is favorably cured with UV light from a light-emitting diode (LED) as a light source; favorably adheres to a polyvinyl chloride sheet or the like; sufficiently suppresses the occurrence of cockling; and has a very low viscosity, a high flash point, and low skin irritation, thereby allowing driving of an inkjet head at lower energy (at low power, without heating), high speed printing at high frequencies, and ejection of a large number of fine liquid droplets from fine nozzles, and improvement in safety, and relates to a printed material.

BACKGROUND ART

In recent years, an inkjet recording method has been often used in the field of production of large-sized advertisement requiring a large image area for outdoor use. Substrates to be used for such advertisements are tough polyvinyl chloride sheets durable for outdoor use such as a sheet made of a vinyl chloride resin itself or a tarpaulin sheet made of a composite material. As an ink for inkjet printing to be printed on such a polyvinyl chloride sheet, for example, a photocurable ink composition for inkjet printing free of volatile components has been suggested (see, for example, Patent Literatures 1 and 2).

The ink compositions for inkjet printing according to Patent Literatures 1 and 2 are cured using a high-energy light source, such as a metal halide lamp, which has been conventionally used as a light source. The use of such a high-energy light source, such as a metal halide lamp, however, raises problems that ozone is generated, a large-sized irradiation device is, needed, and the lamp life is short.

For this reason, a low-energy light-emitting diode lamp (LED lamp) has been recently used as a light source.

Therefore, a photocurable ink composition for inkjet printing that is sufficiently cured, has good printability (e.g. adhesion, improvement in cockling) and safety (e.g. flash point, skin irritation) even when the composition is cured by low energy has been required. A photocurable ink composition for inkjet printing capable of meeting such requirements has been suggested.

Examples of such a photocurable ink for inkjet printing to be used include: (1) a photocurable ink composition for inkjet printing having a flash point of 70° C. or higher which contains a pigment, benzyl acrylate, N-vinylcaprolactam, an acrylated amine compound containing two photopolymerizable functional groups and two amino groups in a molecule, a photopolymerization initiator, and a sensitizer (see Patent Literature 3); (2) a photocurable ink composition for inkjet printing which contains a pigment, a compound containing a (meth)acrylate group and a vinyl ether group in a molecule, a (meth)acrylated amine compound, a hindered amine compound other than (meth)acrylated amine compounds, and a photopolymerization initiator (see Patent Literature 4); and (3) a photocurable ink composition for inkjet printing which contains a pigment, a compound containing a specific amount of a (meth)acrylate group and a vinyl ether group in a molecule, and a specific amount of N-vinylcaprolactam (at least one of phenoxy acrylate and polyfunctional acrylate is used in combination therewith in all examples, see Patent Literature 5).

An energy-saving has ranged to inkjet printers, and an inkjet head capable of being driven at lower energy has been developed. Further, a method of allowing high speed printing by increasing a driving frequency of an inkjet head has been developed, and further an inkjet head capable of ejecting a large number of fine liquid droplets has been developed for achieving high definition recording images without granular feeling.

In order to realize such ideas, the viscosity of the ink composition needs to be low. Because, in the inkjet recording method in which an ink composition is filled in a nozzle and is ejected from the nozzle by an inner pressure of a head, the time for filling the nozzle with the ink composition is directly related to a printing speed, and the inner pressure necessary to eject the ink composition is directly related to a driving energy.

The time for filling the nozzle with an ink composition and the inner pressure necessary to eject an ink composition are greatly controlled by the viscosity of the ink composition. That is, the time for filling the nozzle is small in case of a low-viscosity ink composition, and the inner pressure necessary to eject an ink composition can be suppressed to be low. Further, finer nozzles need longer filling time, and therefore low viscosity is a significantly important property for the ink composition.

However, the photocurable ink compositions for inkjet printing according to Patent Literatures 3 to 5 are relatively highly viscous, and do not meet the above ideas.

If a method of warming and heating an ink composition is used, the viscosity of the ink composition can be reduced while maintaining the ink performance, but the warming and heating need additional energy, and cause damage to an inkjet head.

CITATION LIST

Patent Literature

Patent Literature 1: JP 2004-067991 A
Patent Literature 2: JP 2006-169419 A
Patent Literature 3: WO 2010/143738
Patent Literature 4: JP 2012-092291 A
Patent Literature 5: JP 2012-116934 A

SUMMARY OF INVENTION

Technical Problem

An object of the present invention is to provide a photocurable ink composition for inkjet printing which is favorably cured with light from a light-emitting diode (LED); favorably adheres to a tarpaulin, a polyvinyl chloride sheet, or the like; sufficiently suppresses the occurrence of cockling; and has a low viscosity, a high flash point, and low skin irritation, and is to realize high speed and high definition printing of the ink composition with superior performance at lower energy.

Solution to Problem

The present inventors have made various studies in order to solve the above problems, and have found that use of specific amounts of vinyloxyethoxyethyl acrylate and benzyl acrylate as photopolymerizable compounds, 50% by mass or more of a monofunctional monomer, and a compound that expresses an initiator function when irradiated with light having a wavelength within the range of 450 to 300 nm as a photopolymerization initiator can provide an ink composition which is favorably cured with light from a light-emitting diode (LED), favorably adheres to a polyvinyl chloride sheet such as a tarpaulin and a vinyl chloride resin sheet, sufficiently suppresses the occurrence of cockling, and has both safety and favorable ejection stability at room temperature when ejected from an inkjet head for low-viscosity ink. Thereby, the present invention has been completed.

That is, the present invention relates to a photocurable ink composition for inkjet printing, at least containing:

photopolymerizable compounds; and
a photopolymerization initiator,
the photopolymerizable compounds containing vinyloxyethoxyethyl acrylate and benzyl acrylate, the amount of the vinyloxyethoxyethyl acrylate being within the range of 4% to 40% by mass, the amount of the benzyl acrylate being within the range of 10% to 65% by mass,
the photopolymerization initiator containing a compound that expresses an initiator function when irradiated with light having a wavelength within the range of 450 to 300 nm,
the photocurable ink composition having a flash point measured by a method in accordance with JIS K 2256 using a Setaflash Closed Cup Tester of 70° C. or higher and a viscosity at 25° C., of 5 mPa·s or lower, and
further containing 50% by mass or more of a monofunctional monomer.

The photocurable ink composition of the present invention preferably further contains a sensitizer which is a compound that expresses a sensitizing function when irradiated with light having a wavelength of 400 nm or longer.

In the photocurable ink composition of the present invention, the amount of the vinyloxyethoxyethyl acrylate is preferably within the range of 15% to 40% by mass, and the amount of the benzyl acrylate is preferably within the range of 20% to 55% by mass.

The photocurable ink composition of the present invention preferably further contains 5% to 35% by mass of N-vinylcaprolactam.

The photocurable ink composition of the present invention preferably further contains 5% to 20% by mass of isobornyl acrylate.

The present invention also relates to a printed material obtained by printing the photocurable ink composition in a thickness within the range of 1 to 20 μm on a polyvinyl chloride sheet, and photocuring the photocurable ink composition.

The present invention will be explained in detail below.

The photocurable ink composition for inkjet printing of the present invention contains vinyloxyethoxyethyl acrylate and benzyl acrylate as photopolymerizable compounds.

The photocurable ink composition for inkjet printing containing vinyloxyethoxyethyl acrylate and benzyl acrylate each in specific amounts is favorably cured with light from a light-emitting diode (LED), favorably adheres to a polyvinyl chloride sheet such as a tarpaulin and a vinyl chloride resin sheet, and sufficiently suppresses the occurrence of cockling. Further, the low viscosity of 5 mPa·s or lower, the high flash point, and the low skin irritation are maintained. In addition, the photocurable ink composition has favorable ejection stability at room temperature when the composition is ejected from an energy-saving inkjet head for high speed and high definition printing.

The viscosity herein means a value determined by the following method.

The viscosity is determined using an E-type viscometer (trade name: RE100L-type viscometer, produced by TOKI SANGYO CO., LTD.) under the conditions of 25° C. and 50 rpm.

In the present invention, the amount of the vinyloxyethoxyethyl acrylate is within the range of 4% to 40% by mass. If the amount of the vinyloxyethoxyethyl acrylate is less than 4% by mass, a printed material formed using the photocurable ink composition for inkjet printing of the present invention has poor resistance to a solvent such as isopropyl alcohol (IPA). If the amount thereof is more than 40% by mass, the adhesion to a polyvinyl chloride resin sheet decreases. The amount of the vinyloxyethoxyethyl acrylate is preferably within the range of 15% to 40% by mass.

In the present invention, the amount of the benzyl acrylate is within the range of 10% to 65% by mass. If the amount of the benzyl acrylate is less than 10% by mass, the adhesion to a polyvinyl chloride resin sheet decreases. If the amount thereof is more than 65% by mass, the resistance to a solvent such as isopropyl alcohol (IPA) decreases. The amount of the benzyl acrylate is preferably within the range of 20% to 55% by mass.

The photocurable ink composition for inkjet printing of the present invention may contain a monofunctional monomer having a viscosity at 25° C. of 5 mPa·s or lower as a photopolymerizable compound as long as the monomer does not lower the flash point.

Examples of the monofunctional monomer having a viscosity at 25° C. of 5 mPa·s or lower include 2-methoxyethyl acrylate, isobutyl acrylate, isooctyl acrylate, isodecyl acrylate, and octyl/decyl acrylate. These monofunctional monomers having a viscosity of 5 mPa·s or lower may be used alone or two or more of these may be used as necessary.

The photocurable ink composition for inkjet printing of the present invention preferably contains N-vinylcaprolactam as a photopolymerizable compound. The N-vinylcaprolactam is essentially contained in cases where the photocurable ink composition for inkjet printing of the present invention contains a below-listed pigment which is other than a white pigment is used. The N-vinylcaprolactam is optionally contained in cases where the pigment is a white pigment.

In cases where a pigment other than a white pigment is contained, the amount of the N-vinylcaprolactam is preferably 5% to 35% by mass. If the amount of the N-vinylcaprolactam is less than 5% by mass, the adhesion to a polyvinyl chloride sheet decreases. If the amount thereof is more than 35% by mass, the curability decreases. The lower limit of the amount of the N-vinylcaprolactam is more preferably 10% by mass, and the upper limit thereof is more preferably 30% by mass. In cases where a white pigment is used, the photocurable ink composition for inkjet printing preferably contains the N-vinylcaprolactam in an amount within the range of 0% to 35% by mass.

The photocurable ink composition for inkjet printing of the present invention preferably further contains isobornyl acrylate as a photopolymerizable compound. In cases where the photocurable ink composition contains a below-listed pigment, the isobornyl acrylate contained improves the dispersion stability of the pigment. The photocurable ink composition for inkjet printing of the present invention preferably contains 5% to 30% by mass of the isobornyl acrylate. If the amount of the isobornyl acrylate is less than 5% by mass, tackiness may not be sufficiently suppressed. If the amount thereof is more than 30% by mass, the adhesion to a polyvinyl chloride sheet decreases. The lower limit of the amount of the isobornyl acrylate is more preferably 10% by mass, and the upper limit thereof is more preferably 20% by mass.

As the photopolymerizable compounds that constitute the photocurable ink composition for inkjet printing of the present invention, other photopolymerizable compounds may be used in combination with the above described photopolymerizable compounds in such an amount that the performance of the present invention is not impaired, particularly the flash point is not lowered, the viscosity at 25° C. does not exceed 5 mPa·s, and the adhesion to a polyvinyl chloride sheet is not decreased. Such other photopolymerizable compounds are not particularly limited as long as they are ethylenic double bond-containing compound. For example, monofunctional monomers, polyfunctional monomers, prepolymers, and oligomers can be used without any limitation.

Specific examples of the other photopolymerizable compounds include ethylene glycol di(meth)acrylate, diethylene glycol di(meth)acrylate, polyethylene glycol di(meth)acrylate, 1,6-hexanediol di(meth)acrylate, ethoxylated 1,6-hexanediol di(meth)acrylate, neopentyl glycol di(meth)acrylate, ethoxylated neopentyl glycol di(meth)acrylate, propoxylated neopentyl glycol di(meth)acrylate, tripropylene glycol di(meth)acrylate, polypropylene glycol di(meth)acrylate, 1,4-butanediol di(meth)acrylate, 1,9-nonanediol di(meth)acrylate, tetra ethylene glycol di(meth)acrylate, 2-n-butyl-2-ethyl-1,3-propanediol di(meth)acrylate, dimethylol tricyclodecane di(meth)acrylate, hydroxypivalic acid neopentyl glycol di(meth)acrylate, 1,3-butylene glycol di(meth)acrylate, ethoxylated bisphenol A di(meth)acrylate, propoxylated bisphenol A di(meth)acrylate, cyclohexanedimethanol di(meth)acrylate, dimethylol dicyclopentane di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, tetramethylolpropane tri(meth)acrylate, tetramethylolmethane tri(meth)acrylate, pentaerythritol tetra(meth)acrylate, ethylene oxide-modified pentaerythritol tetra(meth)acrylate, caprolactone-modified trimethylolpropane tri(meth)acrylate, ethoxylated isocyanurate tri(meth)acrylate, tri(2-hydroxyethyl isocyanurate) tri(meth)acrylate, glyceryl propoxylate tri(meth)acrylate, tetramethylolmethane tetra(meth)acrylate, ditrimethylolpropane tetra(meth)acrylate, ethoxylated pentaerythritol tetra(meth)acrylate, dipentaerythritol hexa(meth)acrylate, neopentyl glycol oligo(meth)acrylate, 1,4-butanediol oligo(meth)acrylate, 1,6-hexanediol oligo(meth)acrylate, trimethylolpropane oligo(meth)acrylate, pentaerythritol oligo (meth)acrylate, urethane(meth)acrylate, epoxy (meth)acrylate, polyester (meth)acrylate, 2-phenoxyethyl (meth)acrylate, (meth)acryloyl morpholine, 2-hydroxyethyl (meth)acrylate, 2-hydroxypropyl (meth)acrylate, 4-hydroxybutyl (meth)acrylate, isobutyl (meth)acrylate, t-butyl (meth)acrylate, isooctyl (meth)acrylate, cyclohexyl (meth)acrylate, methoxytriethylene glycol (meth)acrylate, 3-methoxybutyl (meth)acrylate, ethoxyethoxyethyl (meth)acrylate, butoxyethyl (meth)acrylate, ethoxydiethylene glycol (meth)acrylate, methoxydipropylene glycol (meth)acrylate, methylphenoxy ethyl (meth)acrylate, dipropylene glycol (meth)acrylate, and ethylene oxide (EO) or propylene oxide (PO) modification products thereof. These other photopolymerizable compounds may be used alone or two or more of these may be used as necessary. Among these, less odorous and low skin irritation compounds are preferably used in terms of safety. The (meth)acrylate herein refers to acrylate or methacrylate.

The photocurable ink composition for inkjet printing of the present invention contains a monofunctional monomer as the photopolymerizable compound in an amount of 50% by mass or more. If the amount of the monofunctional monomer is less than 50% by mass, the adhesion to a polyvinyl chloride resin sheet decreases. The upper limit of the amount of the monofunctional monomer is preferably 85% by mass. If the amount thereof is more than 85% by mass, the resistance to a solvent such as isopropyl alcohol (IPA) may decrease. The amount of the monofunctional monomer is more preferably within the range of 50% to 78% by mass.

The photocurable ink composition for inkjet printing of the present invention contains a photopolymerization initiator (compound) that expresses an initiator function when irradiated with light having a wavelength within the range of 450 to 300 nm. The phrase "expresses an initiator function when irradiated with light having a wavelength within the range of 450 to 300 nm" means that the photopolymerization initiator has light absorption characteristics in the entire wavelength range of 450 to 300 nm. The use of such a photopolymerization initiator makes it possible to enhance the curability of the photocurable ink composition for inkjet printing of the present invention when the composition is irradiated with light from a light-emitting diode (LED).

Specific examples of the photopolymerization initiator include triazine initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, 2,4-trichloromethyl (4'-methoxystyryl)-6-triazine (for example, trade name TAZ-204, produced by Midori Kagaku Co., Ltd.), 2,4,6-trimethylbenzoyldiphenylphosphine oxide (trade name: TPO, produced by Lamberti), and bis(2,4,6-trimethylbenzoyl)-phenylphosphine oxide (trade name: IRGACURE 819, produced by Ciba Specialty Chemicals). Each of these may be used alone, or two or more of these may be used in combination.

The photocurable ink composition for inkjet printing of the present invention preferably contains the photopolymerization initiator in an amount of 3% to 20% by mass. If the amount of the photopolymerization initiator is less than 3% by mass, the composition may not be sufficiently cured by light from a light-emitting diode (LED). Further, an amount more than 20% by mass, which is excessive, is also unfavorable because better effects of the photopolymerization initiator are no longer imparted. The amount of the photopolymerization initiator is more preferably 3% to 13% by mass.

The photocurable ink composition for inkjet printing of the present invention preferably contains a sensitizer (compound) that expresses a sensitizing function when irradiated with light having a wavelength of 400 nm or longer.

The phrase "expresses a sensitizing function when irradiated with light having a wavelength of 400 nm or longer" means that the sensitizer has light absorption characteristics in the wavelength range of 400 nm or longer. The use of such a sensitizer makes it possible to promote the curability of the photocurable ink composition for inkjet printing of the present invention when the composition is irradiated with light from a light-emitting diode (LED). However, the sensitizer may cause color fading or discoloration of the photocurable ink composition for inkjet printing depending on the color of the sensitizer. Therefore, the sensitizer is preferably appropriately used to suit the color characteristics of a target photocurable ink composition for inkjet printing.

Examples of the sensitizer include anthracene derivatives such as 9,10-dibutoxyanthracene, 9,10-diethoxyanthracene, 9,10-dipropoxyanthracene, or 9,10-bis(2-ethylhexyloxy) anthracene, and thioxanthone-based sensitizers such as 2,4-diethylthioxanthone, 2-isopropylthioxanthone, or 4-isopropylthioxanthone. Typical examples of commercially available anthracene derivatives include DBA and DEA (produced by Kawasaki Kasei Chemicals Ltd.). Typical examples of commercially available thioxanthone-based sensitizers include DETX and ITX (produced by Lambson).

The photocurable ink composition for inkjet printing of the present invention preferably contains the sensitizer in an amount within the range of 0.5% to 3% by mass. If the amount of the sensitizer is less than 0.5% by mass, the composition may not be sufficiently cured when irradiated with light from a light-emitting diode (LED). Further, an amount more than 3% by mass, which is excessive, is also unfavorable because better effects are no longer imparted. The photocurable ink composition for inkjet printing of the present invention may contain known photopolymerization initiators and sensitizers in combination with the above listed photopolymerization initiators and sensitizers.

The photocurable ink composition for inkjet printing of the present invention may optionally contain a colorant and a pigment dispersant.

Conventionally used colorants may be unlimitedly used in the photocurable ink composition for inkjet printing of the present invention. In particular, pigments which are favorably dispersed in the ink composition and have excellent light resistance are used. The pigments may be organic pigments or inorganic pigments.

Specific examples of the organic pigments include dye lake pigments, azo pigments, benzimidazolone pigments, phthalocyanine pigments, quinacridone pigments, anthraquinone pigments, dioxazine pigments, indigo pigments, thioindigo pigments, perylene pigments, perynone pigments, diketopyrrolopyrrole pigments, isoindolinone pigments, nitro pigments, nitroso pigments, anthraquinone pigments, flavanthrone pigments, quinophthalone pigments, pyranthrone pigments, and indanthrone pigments.

Examples of the inorganic pigments include carbon black, titanium oxide, red iron oxide, graphite, iron black, chromic oxide green, and aluminum hydroxide.

The photocurable ink composition for inkjet printing of the present invention preferably contains the inorganic pigment in an amount of 1% to 20% by mass. If the amount of the inorganic pigment is less than 1% by mass, an image quality of a printed material to be obtained tends to be impaired. If the amount thereof is more than 20% by mass, the viscosity characteristics of the photocurable ink composition for inkjet printing of the present invention tends to be adversely affected.

The pigment dispersant is used to improve the dispersibility of pigments and the storage stability of the photocurable ink composition for inkjet printing of the present invention. There are no particular limitations on the pigment dispersant as long as it is conventionally used. In particular, a high molecular dispersant is favorably used. Examples of such a pigment dispersant include carbodiimide dispersants, polyesteramine dispersants, aliphatic amine dispersants, modified polyacrylate dispersants, modified polyurethane dispersants, multi-chain polymeric nonionic dispersants, and polymeric ion activators. These pigment dispersants may be used alone or two or more of these may be used as a mixture.

The pigment dispersant is preferably used in an amount within the range of 1 to 200 parts by mass for 100 parts by mass of all the pigments used. If the amount of the pigment dispersant is less than 1 part by mass, the pigment dispersibility and the storage stability of the photocurable ink composition for inkjet printing of the present invention may decrease. The composition may contain the pigment dispersant in an amount of more than 200 parts by mass, but no additional effects may be imparted. The lower limit of the amount of the pigment dispersant is more preferably 5 parts by mass, and the upper limit thereof is more preferably 60 parts by mass.

The photocurable ink composition for inkjet printing of the present invention may optionally contain additives of any kind for expressing various functional properties. Specific examples of the additives include photostabilizers, surface treatment agents, surfactants, viscosity lowering agents, antioxidants, anti-aging agents, crosslinking promoters, polymerization inhibitors, plasticizers, antiseptics, pH adjusters, anti-foaming agents, and moisturizing agents.

The photocurable ink composition for inkjet printing of the present invention obtained from the above constituent materials has a flash point measured by a method in accordance with JIS K 2265 using a Setaflash Closed Cup Tester of 70° C. or higher. The photocurable ink composition for inkjet printing of the present invention having such a flash point is equivalent to a flammable liquid Category 4 under the GHS, and is excellent in safety in terms of low flammability.

The photocurable ink composition for inkjet printing of the present invention has a viscosity at 25° C. of 0.5 mPa·s or lower. The photocurable ink composition for inkjet printing of the present invention having such a viscosity has favorable ejection stability at room temperature when ejected from an energy-saving inkjet head for high speed and high definition printing.

The photocurable ink composition for inkjet printing of the present invention is superior in all the performances of curability when the composition is irradiated with light from a light-emitting diode (LED), adhesion to a vinyl chloride sheet, prevention of cockling, favorable ejection stability at room temperature when the composition is ejected from an energy-saving inkjet head for high speed and high definition printing, a high flash point, and safety in terms of low skin irritation and less odorous. These effects can be obtained as a result of containing the above described specific photopolymerizable compounds in specific amounts and the photopolymerization initiator.

The photocurable ink composition for inkjet printing of the present invention may be prepared by any method, and can be prepared by adding and mixing all the above materials in a bead mill, three-roll mill, or the like.

Furthermore, in the case of using a pigment, the photocurable ink composition for inkjet printing can also be prepared by mixing the pigment, a pigment dispersant, and a photopolymerizable compound to form a concentrated base ink in advance, and then adding components such as photopolymerizable compounds and a photopolymerization initiator thereto so as to achieve a desired composition.

A polyvinyl chloride sheet such as a tarpaulin or vinyl chloride resin sheet is preferred for the substrate on which the photocurable ink composition for inkjet printing of the present invention to be is printed. Substrates on which ink compositions for ultraviolet inkjet printing have conventionally been printed (such as paper, plastic film, capsules, gel, metal foil, glass, wood, or cloth) can also be used without any problems.

A method of printing and curing the photocurable ink composition for inkjet printing of the present invention specifically involves ejecting the photocurable ink composition for inkjet printing from an inkjet head for low-viscosity ink on a substrate, and exposing the photocurable ink composition for inkjet printing of the present invention landed on the substrate to light to cure the composition.

For example, ejection on the substrate (printing of an image) can be carried out by supplying the photocurable ink composition for inkjet printing of the present invention to a printer head for low-viscosity ink of an inkjet recording printer, and ejecting the ink composition from the printer head for low viscosity ink on a substrate so that the thickness of the coating is 1 to 20 μm. Exposure to light and curing (curing of the image) by light can be carried out by emitting light to the ink composition for inkjet printing of the present invention applied to a substrate as an image.

The inkjet recording printer for printing the photocurable ink composition for inkjet printing of the present invention may be a conventionally used inkjet recording printer. In the case of using a continuous type inkjet recording printer, the electrical conductivity is regulated by further adding an electrical conductivity-imparting agent to the photocurable ink composition for inkjet printing of the present invention.

Examples of the light source used for curing the coating include sources of ultraviolet light, an electron beam, visible light, and a light-emitting diode (LED). The photocurable ink composition for inkjet printing of the present invention is greatly cured even in the case of using an LED as a light source. In addition, the use of an LED enables the coating to be cured at low energy without generating ozone. Light from an LED is preferably an active energy beam having a peak wavelength within the range of 420 to 365 nm. A printed material obtained in this manner is also one aspect of the present invention.

That is, the printed material of the present invention is obtained by printing the photocurable ink composition for inkjet printing of the present invention in a thickness of 1 to 20 μm on a polyvinyl chloride sheet, and photocuring the photocurable ink composition for inkjet printing. In the printed material of the present invention, the thickness of the printed material formed by using the photocurable ink composition for inkjet printing of the present invention is within the range of 1 to 20 μm. If the thickness of the printed material formed by using the photocurable ink composition for inkjet printing of the present invention is less than 1 μm, the printed material is likely to be influenced by oxygen inhibition. If the thickness thereof is greater than 20 μm, an inner portion is less likely to be cured.

Advantageous Effects of Invention

The present invention can provide a photocurable ink composition for inkjet printing which is favorably cured with light from a light-emitting diode (LED), favorably adheres to a polyvinyl chloride sheet such as a tarpaulin and a vinyl chloride resin sheet, suppresses the occurrence of cockling, and has both safety and favorable ejection stability at room temperature when ejected from an inkjet head for low-viscosity ink. The present invention can also provide a printed material.

DESCRIPTION OF EMBODIMENTS

The present invention is described in more detail below with reference to examples, but is not limited to these examples. The term "%" refers to "% by mass" and the term "part" refers to "part by mass" unless specifically indicated otherwise.

The materials used in the following examples and comparative examples are as listed below.
<Pigment Dispersant>
Ajisper (registered trademark) PB821 (produced by Ajinomoto Co., Inc.)
Solsperse 56000 (produced by The Lubrizol Corporation)
<Photopolymerizable Compound>
CN371: (REACTIVE AMINE COINITIATOR, produced by SARTOMER, amine value: 137, containing two amino groups and two acryloyl groups)
V#160: Benzyl acrylate (produced by OSAKA ORGANIC CHEMICAL INDUSTRY LTD.)
Isobutyl acrylate (produced by OSAKA ORGANIC CHEMICAL INDUSTRY LTD.)
Isooctyl acrylate (produced by SARTOMER)
Isodecyl acrylate (produced by SARTOMER)
Octyl/decyl acrylate (produced by SARTOMER)
Triethylene glycol divinyl ether (produced by ISP Japan KK)
VEEA: Vinyloxyethoxyethyl acrylate (produced by NIPPON SHOKUBAI CO., LTD)
V-CAP: N-vinylcaprolactam (produced by ISP Japan KK)
IBXA: Isobornyl acrylate (produced by OSAKA ORGANIC CHEMICAL INDUSTRY LTD.)
2MTA: 2-Methoxy ethyl acrylate (produced by OSAKA ORGANIC CHEMICAL INDUSTRY LTD.)
HDDA: 1,6-Hexanediol diacrylate (produced by DAICEL-ALLNEX LTD.)
<Photopolymerization Initiator>
TPO: 2,4,6-Trimethylbenzoyldiphenylphosphine oxide (produced by Lamberti)
<Sensitizer>
DETX: 2,4-Diethylthioxanthone
<Additive>
BYK-315 (silicone additive, produced by BYK Chemie)

Examples 1 to 21 and Comparative Examples 1 to 6

Preparation of Photocurable Ink Composition for Inkjet Printing

Black

A mixture of a pigment (pigment black 7), a pigment dispersant (AJISPER PB821), and a photopolymerizable compound (IBXA) blended in a ratio (mass ratio) of 20/8/72 was dispersed using an Eiger mill (using zirconia beads having a diameter of 0.5 mm as media) to obtain a concentrated base. The resulting concentrated base was blended with components according to the composition (% by mass) shown in Table 1. In this manner, a photocurable ink composition for inkjet printing of each of Examples 1 to 13 and 18, and Comparative Examples 1 to 6 was obtained.

Yellow

A mixture of a pigment (pigment yellow 150), a pigment dispersant (Solsperse 56000, produced by The Lubrizol Corporation), and a photopolymerizable compound (IBXA) blended in a ratio (mass ratio) of 16/6.4/77.6 was dispersed using an Eiger mill (using zirconia beads having a diameter of 0.5 mm as media) to obtain a concentrated base. The resulting concentrated base was blended with components according to the composition (% by mass) shown in Table 1.

In this manner, a photocurable ink composition for inkjet printing of Example 14 was obtained.

Cyan

A mixture of a pigment (pigment blue 15:4), a pigment dispersant (Solsperse 56000, produced by The Lubrizol Corporation), and a photopolymerizable compound (IBXA) blended in a ratio (mass ratio) of 20/8/72 was dispersed using an Eiger mill (using zirconia beads having a diameter of 0.5 mm as media) to obtain a concentrated base. The resulting concentrated base was blended with components according to the composition (% by mass) shown in Table 1. In this manner, a photocurable ink composition for inkjet printing of each of Examples 15 and 19 was obtained.

Magenta

A mixture of a pigment (Pigment Red 122), a pigment dispersant (Solsperse 56000, produced by The Lubrizol Corporation), and a photopolymerizable compound (isobornyl acrylate) blended in a ratio (mass ratio) of 16/9.6/74.4 was dispersed using an Eiger mill (using zirconia beads having a diameter of 0.5 mm as media) to obtain a concentrated base. The resulting concentrated base was blended with components according to the composition (% by mass) shown in Table 1. In this manner, a photocurable ink composition for inkjet printing of each of Examples 16 and 20 was obtained.

White

A mixture of titanium oxide, a pigment dispersant (AJISPER PB821), and a photopolymerizable compound (IBXA) blended in a ratio (mass ratio) of 40/4/56 was dispersed using an Apex mill (using zirconia beads having a diameter of 0.5 mm as media) to obtain a concentrated base. The resulting concentrated base was blended with components according to the composition (% by mass) shown in Table 1. In this manner, a photocurable ink composition for inkjet printing of each of Examples 17 and 21 was obtained.

[Measurement of Viscosity of Photocurable Ink Composition for Inkjet Printing]

The viscosities of the photocurable ink compositions for inkjet printing obtained in Examples 1 to 21 and Comparative Examples 1 to 6 were measured under the conditions of 25° C. and 50 rpm using an E-type viscometer (trade name: RE100L viscometer, Toki Sangyo Co., Ltd.). Table 2 shows the results.

[Measurement of Flash Point of Photocurable Ink Composition for Inkjet Printing]

The flash points of the photocurable ink compositions for inkjet printing obtained in Examples 1 to 21 and Comparative Examples 1 to 6 were measured while maintaining the temperature at a constant level with an aluminum block using a Setaflash Closed Cup Tester by a method in accordance with JIS K 2265. Table 2 shows the results.

[Performance Evaluation of Photocurable Ink Composition for Inkjet Printing]

The photocurable ink compositions for inkjet printing obtained in Examples 1 to 21 and Comparative Examples 1 to 6 were applied to a polyvinyl chloride sheet (Flontlit Grossy 120 g, produced by Cooley) using a #4 bar coater. Next, the ink compositions were cured using a Z-8 lamp (mercury lamp) produced by Heraeus or an LED lamp produced by Phoseon Technology. The cured ink compositions were then evaluated for a Z-8 cure rate, an LED cure rate, adhesion, solvent resistance, and cockling according to the methods described below. Table 2 shows the results.

(Cure Rate)

A cure rate was evaluated as the number of times of passes performed until surface tackiness was no longer observed under irradiation conditions of 60 W×23 m/min and distance of 13 cm (cumulative amount of UV light: 30 mJ/cm$^2$) using a Z-8 lamp (mercury lamp) produced by Heraeus.

(LED Cure Rate)

An LED cure rate was evaluated as the number of times of passes performed until surface tackiness was no longer observed under irradiation conditions of 40 mJ/cm$^2$ per second using an LED lamp produced by Phoseon Technology.

(Adhesion)

Crosscuts were made in each coating, and the degree of ink peeling with cellophane tape was evaluated based on the criteria indicated below.

Good: Peeling of coating not observed

Fair: Peeling of 80% or more and less than 100% of coating observed

Poor: Peeling of less than 80% of coating observed (Solvent Resistance)

The degree of peeling of the coating was evaluated based on the following criteria when the coating was rubbed 10 times at a load of 500 g with a bleached cloth soaked with isopropyl alcohol (IPA) using a Gakushin-type rubbing tester (produced by Daiei Kagaku Seiki Mfg. Co., Ltd.).

Good: Peeling of coating not observed

Fair: Slight peeling of coating observed

Poor: Peeling of coating observed (Cockling)

The ink compositions were applied to a polyvinyl chloride sheet (Flontlit Grossy 120 g, produced by Cooley) using a #12 bar coater, and the presence of wrinkles (degree of shrinkage) on the back of a sheet formed by irradiating with UV light was evaluated based on the criteria indicated below.

Good: Absence of shrinkage in coated portions as in non-coated portions

Poor: Presence of shrinkage and bulging in coated portions in comparison with non-coated portions (Ejection Stability of Photocurable Ink Composition for Inkjet Printing)

An inkjet recording device equipped with an inkjet nozzle for low-viscosity ink and the photocurable ink compositions for inkjet printing according to Examples 1 to 21 and Comparative Examples 1 to 6 were allowed to stand in an atmospheric temperature of 25° C. for 24 hours, and the temperatures of the device so that the ink compositions were set to 25° C. Thereafter, the compositions were continuously printed on a polyvinyl chloride sheet (Flontlit Glossy 120 g, produced by Cooley) using the device under the atmosphere temperature of 25° C., and ejection stabilities were evaluated.

Good: No disturbance of printing observed, stable ejection

Poor: Disturbance of printing observed or not stable ejection (Hazard Information)

The Global Harmonization System (GHS) of classification and labelling of chemicals was used.

TABLE 1

| Composition | Example 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Black concentrated base | 8 | 8 | 8 | 8 | 8 | 8 | 8 | 8 | 8 | 8 | 8 | 8 | 8 | — |
| Yellow concentrated base | — | — | — | — | — | — | — | — | — | — | — | — | — | 15 |
| Cyan concentrated base | — | — | — | — | — | — | — | — | — | — | — | — | — | — |
| Magenta concentrated base | — | — | — | — | — | — | — | — | — | — | — | — | — | — |
| White concentrated base | — | — | — | — | — | — | — | — | — | — | — | — | — | — |
| CN371 | — | — | — | — | — | — | — | — | — | — | — | — | — | — |
| V-CAP | 15.5 | 15.5 | 15.5 | 15.5 | 15.5 | 10 | 20 | 30 | 15.5 | 15.5 | 15.5 | 15.5 | 15.5 | 15.5 |
| HDDA | — | — | — | — | — | — | — | — | — | — | — | — | — | — |
| Benzyl acrylate | 64 | 59 | 54 | 49 | 29 | 54.5 | 44.5 | 34.5 | 29 | 29 | 39 | 39 | 39 | 42 |
| 2-Methoxyethyl acrylate | — | — | — | — | — | — | — | — | 20 | — | — | — | — | — |
| Isobutyl acrylate | — | — | — | — | — | — | — | — | — | 20 | — | — | — | — |
| Isooctyl acrylate | — | — | — | — | — | — | — | — | — | — | 10 | — | — | — |
| Isodecyl acrylate | — | — | — | — | — | — | — | — | — | — | — | 10 | — | — |
| Octyl/decyl acrylate | — | — | — | — | — | — | — | — | — | — | — | — | 10 | — |
| Triethylene glycol divinyl ether | — | — | — | — | — | — | — | — | — | — | — | — | — | — |
| Vinyloxyethoxy ethyl acrylate | 5 | 10 | 15 | 20 | 40 | 20 | 20 | 20 | 20 | 20 | 20 | 20 | 20 | 20 |
| TPO | 5 | 5 | 5 | 5 | 5 | 5 | 5 | 5 | 5 | 5 | 5 | 5 | 5 | 5 |
| DETX | 2 | 2 | 2 | 2 | 2 | 2 | 2 | 2 | 2 | 2 | 2 | 2 | 2 | 2 |
| BYK315 | 0.5 | 0.5 | 0.5 | 0.5 | 0.5 | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 | 100 | 100 | 100 | 100 | 100 |

| Composition | Example 15 | 16 | 17 | 18 | 19 | 20 | 21 | Comparative Example 1 | 2 | 3 | 4 | 5 | 6 |
|---|---|---|---|---|---|---|---|---|---|---|---|---|---|
| Black concentrated base | — | — | — | 8 | — | — | — | 8 | 8 | 8 | 8 | 8 | 8 |
| Yellow concentrated base | — | — | — | — | — | — | — | — | — | — | — | — | — |
| Cyan concentrated base | 8 | — | — | — | 8 | — | — | — | — | — | — | — | — |
| Magenta concentrated base | — | 15 | — | — | — | 15 | — | — | — | — | — | — | — |
| White concentrated base | — | — | 32 | — | — | — | 32 | — | — | — | — | — | — |
| CN371 | — | — | — | — | — | — | — | 9 | 9 | 9 | — | — | — |
| V-CAP | 15.5 | 15.5 | — | 15.5 | 15.5 | 15.5 | — | 15.5 | 15.5 | 15.5 | 15.5 | 15.5 | 15.5 |
| HDDA | — | — | — | — | — | — | — | 28 | 10 | 28 | 28 | — | — |
| Benzyl acrylate | 49 | 42 | 40.5 | 39 | 49 | 42 | 40.5 | 9 | 9 | 32 | 41 | 9 | 69 |
| 2-Methoxyethyl acrylate | — | — | — | — | — | — | — | 23 | 41 | — | — | — | — |
| Isobutyl acrylate | — | — | — | — | — | — | — | — | — | — | — | — | — |
| Isooctyl acrylate | — | — | — | — | — | — | — | — | — | — | — | — | — |
| Isodecyl acrylate | — | — | — | — | — | — | — | — | — | — | — | — | — |
| Octyl/decyl acrylate | — | — | — | — | — | — | — | — | — | — | — | — | — |
| Triethylene glycol divinyl ether | — | — | — | 10 | — | — | — | — | — | — | — | — | — |
| Vinyloxyethoxy ethyl acrylate | 20 | 20 | 20 | 20 | 20 | 20 | 20 | — | — | — | — | 60 | — |
| TPO | 5 | 5 | 5 | 5 | 7 | 7 | 7 | 5 | 5 | 5 | 5 | 5 | 5 |
| DETX | 2 | 2 | 2 | 2 | 0 | 0 | 0 | 2 | 2 | 2 | 2 | 2 | 2 |
| BYK315 | 0.5 | 0.5 | 0.5 | 0.5 | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 | 100 | 100 | 100 | 100 |

TABLE 2

| Evaluation items | Example 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Viscosity (mPa·s, 25° C.) | 4.3 | 4.4 | 4.4 | 4.5 | 4.4 | 4.3 | 4.1 | 4 | 3.6 | 2.5 | 4.7 | 4.7 | 4.7 | 4.8 |

TABLE 2-continued

| Evaluation items | | | | | | | | | | | | | | |
|---|---|---|---|---|---|---|---|---|---|---|---|---|---|---|
| Flash point (° C.) | 93 or higher | 93 or higher | 93 or higher | 93 or higher | 93 or higher | 93 or higher | 93 or higher | 93 or higher | 93 or higher | 93 or higher | 93 or higher | 93 or higher | 93 or higher | 93 or higher |
| Z-8 cure rate | 1 time | 1 time | 1 time | 1 time | 1 time | 1 time | 1 time | 1 time | 1 time | 1 time | 1 time | 1 time | 1 time | 1 time |
| Adhesion | Good | Good | Good | Good | Good | Good | Good | Good | Good | Good | Good | Good | Good | Good |
| Solvent resistance | Fair | Fair | Good | Good | Good | Good | Good | Good | Good | Good | Good | Good | Good | Good |
| Cockling | Good | Good | Good | Good | Good | Good | Good | Good | Good | Good | Good | Good | Good | Good |
| Ejection stability | Good | Good | Good | Good | Good | Good | Good | Good | Good | Good. | Good | Good | Good | Good |
| LED cure rate | 1 time | 1 time | 1 time | 1 time | 1 time | 1 time | 1 time | 1 time | 1 time | 1 time | 1 time | 1 time | 1 time | 1 time |
| Adhesion | Good | Good | Good | Good | Good | Good | Good | Good | Good | Good | Good | Good | Good | Good |
| Solvent resistance | Fair | Fair | Good | Good | Good | Good | Good | Good | Good | Good | Good | Good | Good | Good |
| Cockling | Good | Good | Good | Good | Good | Good | Good | Good | Good | Good | Good | Good | Good | Good |
| Ejection stability | Good | Good | Good | Good | Good | Good | Good | Good | Good | Good | Good | Good | Good | Good |
| GHS hazard information | No acute toxicity | No acute toxicity | No acute toxicity | No acute toxicity | No acute toxicity | No acute toxicity | No acute toxicity | No acute toxicity | No acute toxicity | No acute toxicity | No acute toxicity | No acute toxicity | No acute toxicity | No acute toxicity |

| Evaluation items | Example | | | | | | | Comparative Example | | | | | |
|---|---|---|---|---|---|---|---|---|---|---|---|---|---|
| | 15 | 16 | 17 | 18 | 19 | 20 | 21 | 1 | 2 | 3 | 4 | 5 | 6 |
| Viscosity (mPa·s, 25° C.) | 4.4 | 4.9 | 5 | 4.8 | 4.4 | 4.9 | 5 | 6.6 | 5.5 | 9.8 | 7.8 | 4.3 | 4.2 |
| Flash point (° C.) | 93 or higher | 93 or higher | 93 or higher | 93 or higher | 93 or higher | 93 or higher | 93 or higher | 93 or higher | Lower than 70 | 93 or higher | 93 or higher | 93 or higher | 93 or higher |
| Z-8 cure rate | 1 time | 1 time | 1 time | 1 time | 1 time | 1 time | 1 time | 1 time | 1 time | 1 time | 1 time | 1 time | 1 time |
| Adhesion | Good | Good | Good | Good | Good | Good | Good | Good | Good | Good | Good | Poor | Good |
| Solvent resistance | Good | Good | Good | Good | Good | Good | Good | Good | Good | Good | Good | Good | Poor |
| Cockling | Good | Good | Good | Good | Good | Good | Good | Good | Good | Good | Good | Good | Good |
| Ejection stability | Good | Good | Good | Good | Good | Good | Good | Poor | Poor | Poor | Poor | Good | Good |
| LED cure rate | 1 time | 1 time | 1 time | 1 time | 1 time | 1 time | 1 time | 1 time | 1 time | 1 time | 1 time | 1 time | 1 time |
| Adhesion | Good | Good | Good | Good | Good | Good | Good | Good | Good | Good | Good | Poor | Good |
| Solvent resistance | Good | Good | Good | Good | Good | Good | Good | Good | Good | Good | Good | Good | Poor |
| Cockling | Good | Good | Good | Good | Good | Good | Good | Good | Good | Good | Good | Good | Good |
| Ejection stability | Good | Good | Good | Good | Good | Good | Good | Poor | Poor | Poor | Poor | Good | Good |
| GHS hazard information | No acute toxicity | No acute toxicity | No acute toxicity | No acute toxicity | No acute toxicity | No acute toxicity | No acute toxicity | No acute toxicity | No acute toxicity | No acute toxicity | No acute toxicity | No acute toxicity | No acute toxicity |

As shown in Table 2, the photocurable ink compositions for inkjet printing according to Examples 1 to 21 have a practical level of curability and demonstrate superior adhesion, solvent resistance, prevention of cockling, ejection stability, and safety even in the case of using a low output lamp such as a light-emitting diode (LED) despite having a flash point of 70° C. or higher in all cases. On the other hand, the photocurable ink compositions for inkjet printing according to Comparative Examples 1 to 6 have a flash point of lower than 70° C., poor solvent resistance, and low ejection stability.

INDUSTRIAL APPLICABILITY

The present invention can provide a photocurable ink composition for inkjet printing which is favorably cured with light from a light-emitting diode (LED), favorably adheres to a polyvinyl chloride sheet such as a tarpaulin and a vinyl chloride resin sheet, suppresses the occurrence of cockling, and has both safety and favorable ejection stability at room temperature when ejected from an inkjet head for low-viscosity ink. The present invention can also provide a printed material.

The invention claimed is:
1. A printed material, obtained by printing a photocurable composition on a polyvinyl chloride sheet,
wherein the photocurable ink composition comprises:
photopolymerizable compounds; and
a photopolymerization initiator,
wherein the photopolymerizable compounds comprise vinyloxyethoxyethyl acrylate and benzyl acrylate, an amount of the vinyloxyethoxyethyl acrylate being within a range of 4% to 40% by mass, an amount of the benzyl acrylate being within a range of 39% to 65% by mass,
the photopolymerization initiator comprises a compound that expresses an initiator function when irradiated with light having a wavelength within the range of 450 to 300 nm,
the photocurable ink composition has a flash point measured by a method in accordance with JIS K 2265 using a Setaflash Closed Cup Tester of 70° C. or higher and a viscosity at 25° C. of 5 mPa·s or lower, and
a total amount of a monofunctional monomer is 50% by mass or more,
wherein the photocurable ink composition is printed in a thickness within a range of 1 to 20 μm on the polyvinyl chloride sheet and photocured.

2. The printed material according to claim 1, wherein the photocurable ink composition further comprises a sensitizer, the sensitizer is a compound that expresses a sensitizing function when irradiated with light having a wavelength of 400 nm or longer.

3. The printed material according to claim 1,
wherein the amount of the vinyloxyethoxyethyl acrylate is within a range of 15% to 40% by mass, and the amount of the benzyl acrylate is within a range of 20% to 55% by mass.

4. The printed material according to claim 1, wherein the photocurable ink composition further comprises 5% to 35% by mass of N-vinylcaprolactam.

5. The printed material according to claim 1, wherein the photocurable ink composition further comprises 5% to 20% by mass of isobornyl acrylate.

* * * * *